Figure 1:
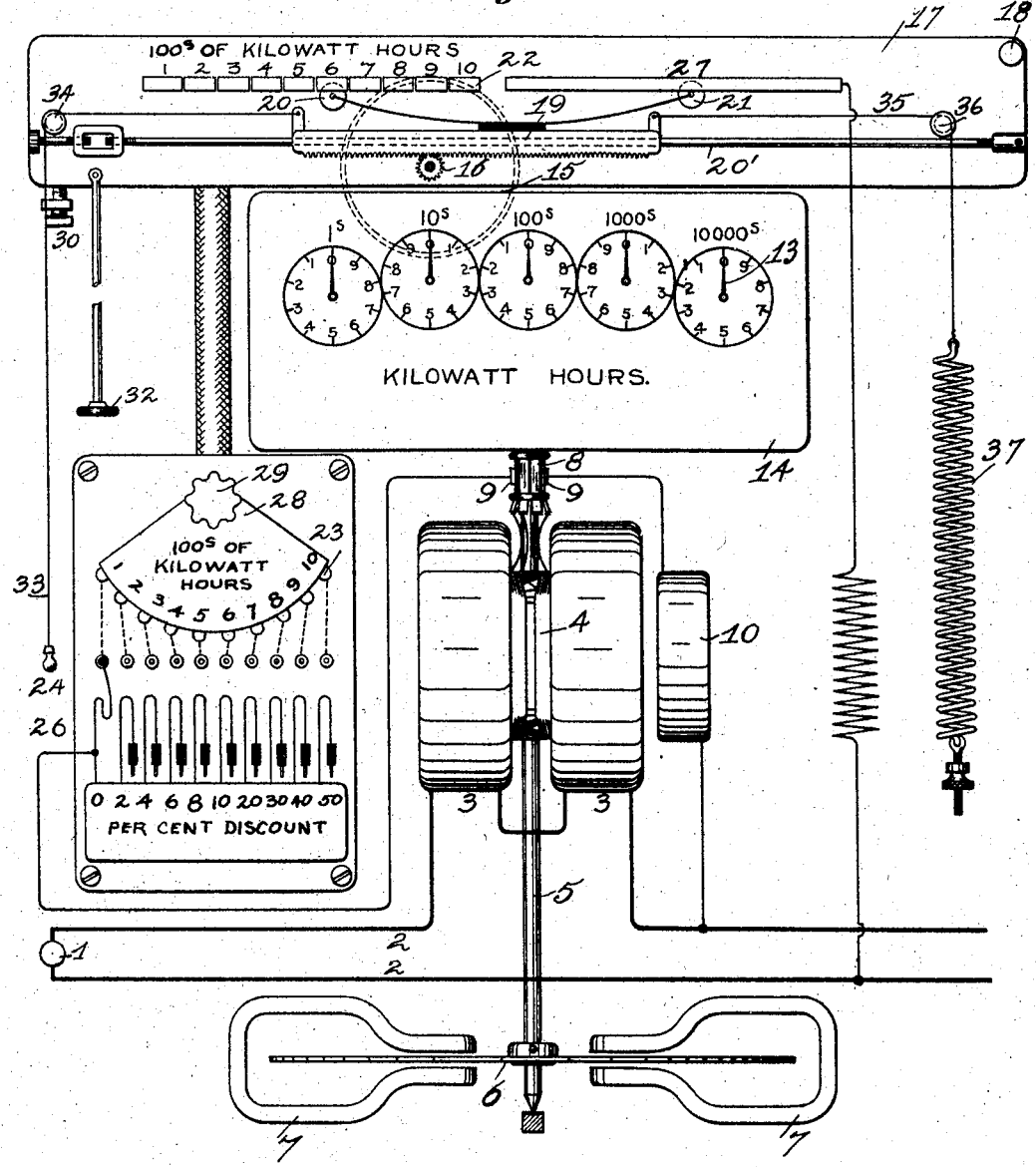

No. 796,048. PATENTED AUG. 1, 1905.
T. DUNCAN.
ELECTRIC METER.
APPLICATION FILED JULY 18, 1901. RENEWED JAN. 7, 1905.

2 SHEETS—SHEET 2.

WITNESSES: INVENTOR.
Thomas Duncan
BY Charles A. Brown Cragg & Belfield
ATTORNEYS

UNITED STATES PATENT OFFICE.

THOMAS DUNCAN, OF CHICAGO, ILLINOIS.

ELECTRIC METER.

No. 796,048.  Specification of Letters Patent.  Patented Aug. 1, 1905.

Application filed July 18, 1901. Renewed January 7, 1905. Serial No. 239,974.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to electric meters, and has for its object the provision of a meter which may operate at one rate per unit of load or energy up to a given predetermined amount, at a reduced rate per unit of load or energy for a predetermined additional quantity of energy, a further reduced rate for another predetermined additional quantity of energy, &c.

I am enabled to provide a meter which is adapted to operate at one rate of operation to measure load or energy that the consumer is to be charged for at a given rate, the meter in its further operation in measuring a given additional quantity of energy operating at a reduced rate to afford the consumer discount agreed upon and in measuring additional given quantities of energy operating at further reduced speeds. Thus the consumer may be given a sliding discount. He may be charged a normal rate for a given minimum quantity of energy, a reduced rate for a given excess quantity of energy, a further reduced rate for a further given excess quantity of energy, &c. For this purpose I have hitherto provided a torque-modifying resistance divided into sections having fixed terminal contacts, with each of which sections trolley-contacts were connected, the trolley-contacts corresponding to the various quantities of energy to be measured by the instrument, a trolley being operated by the meter and passed over the contacts as the meter measures the energy, so that the sections of resistance were cumulatively included in circuit with a meter-winding to reduce the torque of the meter or otherwise modify the speed thereof per unit of load or energy, this reduction in speed successively diminishing as an aggregate quantity of energy measured is increased step by step. A switching device was employed by which one or more of the trolley-contacts could be excluded from circuit with the resistance, whereby the trolley in engaging these contacts would directly include the meter in circuit without including the resistance, so that adjustment might be effected for determining when the meter should operate at its reduced speeds.

While in my prior device there was a means for disconnecting trolley-contacts from the resistance, so that the meter would not be subject to the discounting influence of this resistance, there was no means of securing a flexible adjustment of the resistance whereby the quantities of energy subject to given discounts might be varied—that is, when the discount resistance began to take effect it would have its circuit relation varied in a uniform manner, owing to the fixed construction of the switching parts. In accordance with my present invention I provide the sections of the discount resistance with flexible and relatively adjustable terminals, so that not only may the quantity of energy that is to receive a given discount be varied, but the number of sections of resistance to be included in circuit with the meter-winding during the time a predetermined quantity of energy is being measured may be varied, so that the rates of discount are also flexible.

I will explain my invention more fully by reference to the accompanying drawings, in which—

Figure 2:
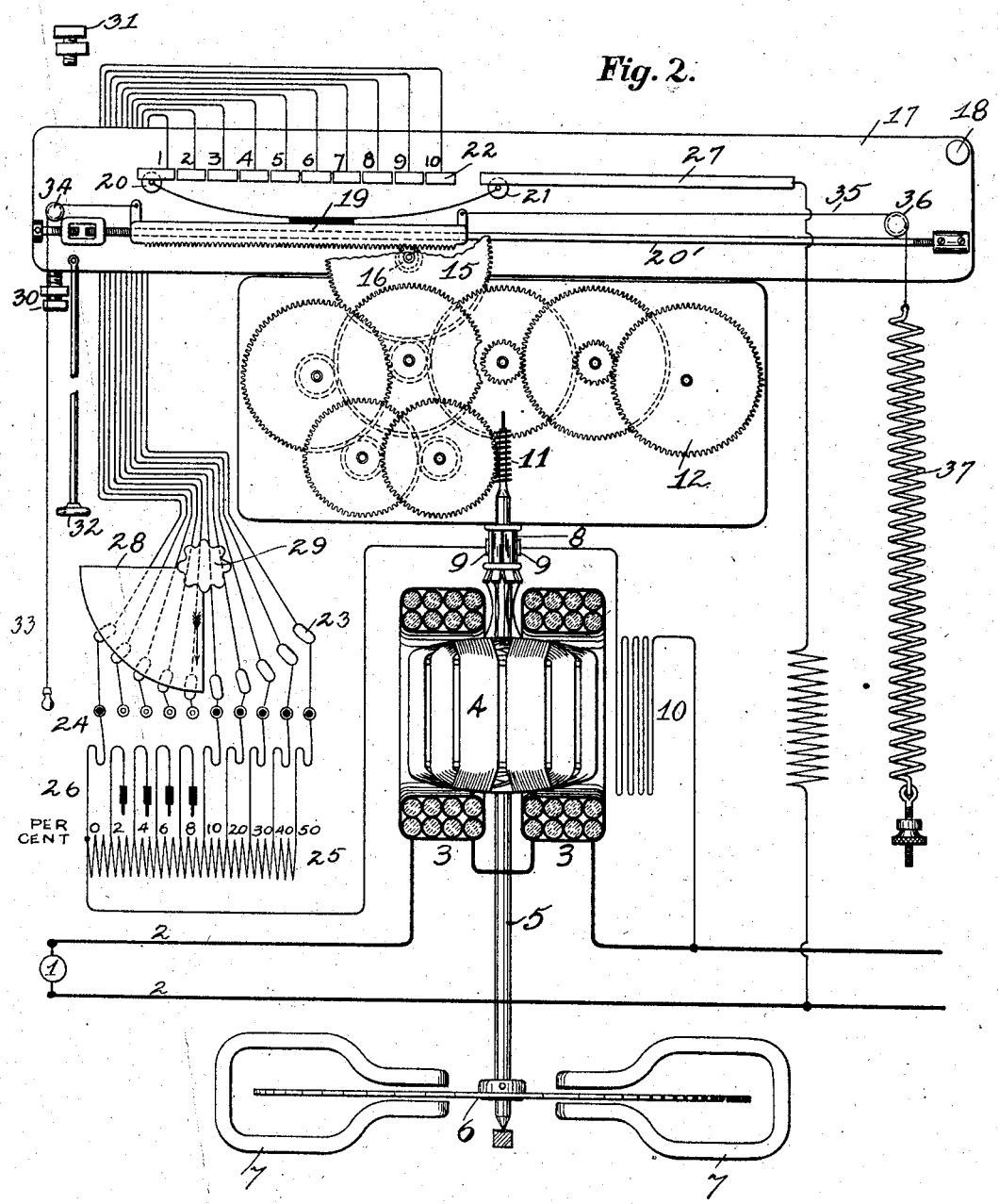

Figure 1 is a diagrammatic view of a system of electrical distribution with a meter of my invention associated therewith. Fig. 2 is a view similar to Fig. 1, the reading-dial of the meter being removed, while the switching apparatus is differently adjusted.

Like parts are indicated by similar characters of reference in both views.

I have illustrated in both figures a source of current 1, either direct or alternating, conveying current over the mains 2 2 to translating devices. A current-field winding, subdivided into coils 3 3, is included in one of the mains and produces a field proportional to the current. A pressure-winding, in this instance in the form of a commutated armature 4, is mounted upon a spindle 5, at the lower end of which is provided a damping-disk 6, arranged within the fields of permanent magnets 7 7. The spindle 5 supports the commutator 8, with which commutator-brushes 9 9 are engaged. These brushes include the armature 4 in bridge of the transmission-mains, whereby a field is produced proportional to the pressure. A starting-coil 10 may also be included in circuit with the armature to aid the meter on light loads and to overcome friction. There is thus organized the motor element of a wattmeter; but I do not wish to be limited to the precise form of meter illustrated for measuring loads. The upper end of the spindle is provided with a worm 11, which engages the wheels of a counting-train 12, that actuate the indexes 13 upon the reading-dial 14. This wheel-train includes a wheel 15, that is preferably distinct from the counting portion of the train as far as the operation of the indexes is concerned, but is actuated at a suitable rate to include the prediscount resistance in circuit or otherwise modify the rate of operation of the meter at the proper time. This wheel 15 is provided with a pinion 16, coaxially arranged with respect thereto, the pinion 16 being insulated from the wheel 15 and the swinging frame 17, hinged at 18. The pinion 16 engages the horizontally-movable trolley rack-bar 19, that is mounted to reciprocate upon a guiding-rod 20'. The rack-bar 19 carries two trolleys 20 and 21, the trolley 20 being adapted to make contact successively with the trolley-contacts 22, corresponding to different quantities of energy. The trolley-contacts 22 are connected with the switch-buttons 23, which in turn are in the preferred embodiment of the invention connected with sockets 24. A resistance 25 is divided into sections having independently-adjustable terminals, preferably in the form of switch-plugs 26, adapted for insertion within the sockets 24. The resistance 25 is connected with one of the commutator-brushes, thence through the armature to one transmission-main, the bridge-circuit, including the armature, being completed through the other transmission-main by way of the trolley-bar 27, engaging the trolley 21, the companion trolley 20, the trolley-contact 22 engaging the trolley, the socket 24, and the engaged plug 26 in electrical connection with the trolley-contact engaging the trolley 20.

Let it be supposed that the meter in measuring, for example, each hundred kilowatt-hours effects the passage of the trolley 20 from one of the trolley-contacts to the next during each of these periods of measurement. Let it be supposed, further, that the consumer is to receive no discount until after five hundred kilowatt-hours have been consumed. During the measurement of the first five hundred kilowatt-hours none of the resistance 25 should be included in circuit with the meter, for which purpose the first five of the contacts 23 upon the left should be electrically connected, which connection may be effected by meant of a contact-blade 28, mounted upon a revoluble support 29, which blade 28 is adapted for engagement with all of the contacts 23, whereby the amount of energy for which no discount is to be allowed may be readily adjusted. The resistance 25 is indicated as being divided into nine sections, the first modifying the torque of the meter to produce a two-per-cent. reduction in its rate of operation per unit of load or energy, the first two sections four-per-cent. reduction of this speed, the first three six-per-cent. reduction, the first four eight-per-cent. reduction, the first five ten-per-cent. reduction, the first six twenty-per-cent. reduction, the first seven thirty-per-cent. reduction, the first eight forty-per-cent. reduction, and the total resistance fifty-per-cent. reduction. If the consumer is to receive ten-per-cent. discount for the sixth hundred kilowatt-hours, the sixth plug 26 is inserted within the sixth socket. If the consumer is to receive a twenty-per-cent. discount for the seventh hundred kilowatt-hours, the seventh plug 26 is inserted within the seventh socket 24, and so on throughout the prearranged series of discounts. If the consumer is only to receive two-per-cent. discount for the sixth hundred kilowatt-hours, the second plug 26 of the series is inserted within the sixth socket. If he is to receive six-per-cent. discount for the seventh hundred kilowatt-hours, the fourth plug of the series is inserted within the seventh socket. Thus the resistance adjustment is very flexible, providing for a variety of combinations of sliding discount.

The swinging frame 17 normally rests upon a lower stop 30 to mesh the wheel 15 with the remainder of the wheel-train. At the end of the month or other stated period when the reading of the meter is taken the frame is elevated to permit the resetting of the trolley rack-bar 19 without effecting the restoration of the counting portion of the wheel-train, as it is desired to integrate the totalized measurements during a number of periods. An upper stop 31 is provided for the purpose of limiting the upward movement of the frame, while a rod 32, projecting through the casing of the instrument, may be employed for moving the frame. The trolley rack-bar may be provided with a cord 33 at its left end, passing over a pulley 34, by which the rack-bar may be restored to its initial position after each reading. This rack-bar may also have connected with its right-hand end a cord 35, passing over a pulley 36 and connected with a spring 37 for the purpose of assisting the counting-train in the operation of the rack-bar, the spring serving to overcome friction between the pinion 16 and the rack-bar and also serving, preferably, to compensate for friction in the rest of the wheel-train.

While I have herein shown and particularly described the preferred embodiment of my invention, it is obvious that changes may readily be made without departing from the spirit thereof, and I do not, therefore, wish to be limited to the precise disclosure herein set forth; but,

Having thus described my invention, I claim as new and desire to secure by Letters Patent—

1. The combination with a meter, of a resistance divided into sections for inclusion in circuit with a meter-winding, relatively movable terminals for the said resistance-sections, and a switching device operated by the meter and serving to connect the said resistance-terminals with said armature-winding to thereby include the selected sections of the resistance in circuit with said meter-winding, whereby the meter may be operated at successively different rates of reduced speed, substantially as described.

2. The combination with a meter, of a sectional resistance provided with relatively movable terminals, a moving contact part actuated by the meter and connected with a meter-winding, a set of contacts adapted for engagement with the said movable contact as the meter measures the energy, and means whereby the said movable terminals may be selectively connected with any of the said set of contacts, the said resistance being in circuit with the said meter-winding, substantially as described.

3. The combination with a meter, of a sectional resistance provided with relatively movable terminals in the form of plugs, a moving contact part actuated by the meter and connected with a meter-winding, a set of contacts adapted for engagement with the said movable contact as the meter measures the energy, and sockets electrically connected with the contacts of the said set and adapted to receive the terminal plugs, whereby the sections of the resistance may be selectively connected with the said set of contacts, the said resistance being in circuit with the said meter-winding, substantially as described.

4. The combination with a meter, of a sectional resistance provided with relatively movable terminals in the form of plugs, a moving contact part actuated by the meter and connected with a meter-winding, a set of contacts adapted for engagement with the said movable contact as the meter measures the energy, sockets electrically connected with the contacts of the said set and adapted to receive the terminal plugs, whereby the sections of the resistance may be selectively connected with the said set of contacts, the said resistance being in circuit with the said meter-winding, and a switch for connecting those contacts not connected with the terminals of the resistance directly with the said meter-winding, substantially as described.

5. The combination with a meter, of a sectional resistance provided with relatively movable terminals, a moving contact part actuated by the meter and connected with a meter-winding, a set of contacts adapted for engagement with the said movable contact as the meter measures the energy, means whereby the said movable terminals may be selectively connected with any of the said set of contacts, the said resistance being in circuit with the said meter-winding, and means whereby the contacts of the said set not connected with the resistance, are directly connected with the meter-winding, substantially as described.

6. The combination with a meter, of a resistance divided into sections for inclusion in circuit with a meter-winding, relatively movable terminals for said resistance-sections, and a switching device operated by the meter and serving to connect the said resistance-terminals with the said meter-winding to thereby include the selected sections of the resistance in circuit with the said meter-winding, whereby the meter may be operated at successively different rates of reduced speed, substantially as described.

7. The combination with a meter, of a resistance divided into sections for inclusion in circuit with the armature-winding, relatively movable terminals for said resistance-sections, and a switching device operated by the meter and serving to connect the said resistance-terminals with the said armature-winding to thereby include the selected sections of the resistance in circuit with the said meter-winding, whereby the meter may be operated at successively different rates of reduced speed, substantially as described.

In witness whereof I hereunto subscribe my name this 3d day of June, A. D. 1901.

THOMAS DUNCAN.

Witnesses:
GEORGE L. CRAGG,
HARVEY L. HANSON.